United States Patent
Sharma et al.

(10) Patent No.: US 7,995,499 B2
(45) Date of Patent: Aug. 9, 2011

(54) MINIMIZING SPANNING-TREE PROTOCOL EVENT PROCESSING AND FLOODING IN DISTRIBUTION NETWORKS

(75) Inventors: Rohit Sharma, San Jose, CA (US); Mandar Joshi, Santa Clara, CA (US); Padavala Rao, Santa Clara, CA (US); Gokul Tirumalai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 420 days.

(21) Appl. No.: 11/562,988

(22) Filed: Nov. 23, 2006

(65) Prior Publication Data

US 2008/0123561 A1  May 29, 2008

(51) Int. Cl.
*H04L 12/28* (2006.01)
(52) U.S. Cl. ........................ 370/254; 370/256
(58) Field of Classification Search .................. 370/252, 370/254, 255, 256, 395.53, 400, 404, 407
See application file for complete search history.

(56) References Cited

U.S. PATENT DOCUMENTS

| | | |
|---|---|---|
| 4,811,337 A | 3/1989 | Hart |
| 4,922,486 A | 5/1990 | Lidinsky et al. |
| 5,018,137 A | 5/1991 | Backes et al. |
| 5,138,615 A | 8/1992 | Lamport et al. |
| 5,150,360 A | 9/1992 | Perlman et al. |
| 5,280,480 A | 1/1994 | Pitt et al. |
| 5,323,394 A | 6/1994 | Perlman |
| 5,327,424 A | 7/1994 | Perlman |
| 5,398,242 A | 3/1995 | Perlman |
| 5,400,333 A | 3/1995 | Perlman |
| 5,606,669 A | 2/1997 | Bertin et al. |
| 5,740,171 A | 4/1998 | Mazzola et al. |
| 5,742,604 A | 4/1998 | Edsall et al. |
| 5,761,435 A | 6/1998 | Fukuda et al. |
| 5,764,636 A | 6/1998 | Edsall |
| 5,790,808 A | 8/1998 | Seaman |
| 5,844,902 A | 12/1998 | Perlman |
| 5,870,386 A | 2/1999 | Perlman et al. |
| 5,878,232 A | 3/1999 | Marimuthu |
| 5,959,968 A | 9/1999 | Chin et al. |
| 6,032,194 A | 2/2000 | Gai et al. |
| 6,081,512 A | 6/2000 | Muller et al. |
| 6,202,114 B1 | 3/2001 | Dutt et al. |
| 6,236,659 B1 | 5/2001 | Pascoe |
| 6,388,995 B1 | 5/2002 | Gai et al. |

(Continued)

OTHER PUBLICATIONS

Horowitz, S., Dual-Layer Spanning Tree, A Spanning Tree Proposal for IEEE 802.1Q, May 14, 1997, pp. 45-48.

(Continued)

*Primary Examiner* — Chirag G Shah
*Assistant Examiner* — Minh-Trang Nguyen
(74) *Attorney, Agent, or Firm* — Cesari and McKenna; Michael R. Reinemann

(57) ABSTRACT

In one embodiment, configuring one or more ports of an access layer entity connected to a distribution layer entity to suppress one or more network topology change information from transmitting to the distribution layer entity of a data network, detecting a state change to a forwarding state on the one or more ports of the access layer entity, and configuring the one or more ports of the access layer entity in the data network connected to the distribution layer entity to transmit a predetermined data packet on the one or more ports of the access layer entity whose state has changed to the forwarding state are provided.

20 Claims, 7 Drawing Sheets

U.S. PATENT DOCUMENTS

| | | | |
|---|---|---|---|
| 6,535,491 | B2 | 3/2003 | Dutt et al. |
| 6,628,624 | B1 | 9/2003 | Mahajan et al. |
| 6,801,506 | B1 | 10/2004 | Dey |
| 6,934,263 | B1* | 8/2005 | Seaman ............... 370/256 |
| 6,976,088 | B1 | 12/2005 | Gai et al. |
| 7,061,875 | B1 | 6/2006 | Portolani et al. |
| 7,177,946 | B1 | 2/2007 | Kaluve et al. |
| 7,460,492 | B2 | 12/2008 | Portolani et al. |
| 7,558,878 | B2 | 7/2009 | Kaluve et al. |
| 7,606,177 | B1 | 10/2009 | Mahajan et al. |
| 7,848,264 | B1 | 12/2010 | Gai et al. |
| 2005/0071672 | A1* | 3/2005 | Fung ....................... 713/201 |
| 2005/0198383 | A1* | 9/2005 | Rose et al. ............... 709/245 |
| 2006/0253561 | A1* | 11/2006 | Holmeide et al. ......... 709/223 |
| 2007/0110077 | A1* | 5/2007 | Takashige et al. ...... 370/395.53 |
| 2007/0263554 | A1 | 11/2007 | Finn |
| 2010/0039961 | A1 | 2/2010 | Tallet et al. |

OTHER PUBLICATIONS

Seaman, M. and Delaney, D., Single or Multiple Filtering Databases, May 8, 1997.

Lucent Technologies Inc.'s Initial Disclosure of Prior Art Under Civil Local Rule 16-7, Case No. C98-20836 JW (PVT) ENE.

IEEE Standard 802.1D, Draft Standard for Local Area Networks MAC (Media Access Control) Bridges: Technical and Editorial Corrections, Mar. 6, 1997, pp. 3-10.85-122 and 151-158.

Perlman, Radia, Interconnections: Bridges and Routers, (c) 1992, pp. 54-64.

Hart, John, Extending the IEEE 802.1 MAC Bridge Standard to Remote Bridges, IEE Netowrk, Jan. 1988, pp. 10-15, vol. 2, No. 1.

Bhandari, I, Ofek, Y, Bulent, Y., and Yung, M., Fault-Tolerant Convergence Routing, IEEE, 1994, pp. 229-238.

Perlman, R., An Algorithm for Distributed Computation of Spanning Tree in an Extended LAN, ACM ISSN 0146-4833, 1985, pp. 44-53.

Cheng, C., A protocol to maintain a Mimimum Spanning Tree in a Dynamic Topology, Cimet I.A; Kumar P.R., ACM 0/8979-279 9/88/088/0330, 1998, pp. 330-338.

A more Robust Tree: Active Topology Maintenance in Reconfiguring Bridged Local Area Networks (STP), Seaman, M., 3Com Corp., Mar. 1996.

Cisco Systems, Inc.: Catalyst 5000 Series Release Notes for Software Release 2.1, Doc. No. 78-2896-02, 1996, pp. 1-12.

Cisco Systems, Inc.: Release Notes for Catalyst 2820 Series and Catalyst 1900 Series Firmware Version 5.35, Doc. No. 78-3817-05, Aug. 1997, pp. 1-8.

Configuration and Monitoring Switch Node Software, Bay Networks, BCC Version 3.0, May 1997.

SK-NET Switch 6616 Ethernet/FDDI Switch Configuration Guide, SysKonnect Inc., Mar 1995, pp. 1-42.

An Algorithm for Distributed Computation of Spanning Tree in an Extended LAN, Perlman, R., Digital Equipment Corp, ACM 0-89791-164-4/85, 1985, pp. 44-53.

* cited by examiner

MINIMIZING SPANNING-TREE PROTOCOL EVENT PROCESSING AND FLOODING IN DISTRIBUTION NETWORKS

TECHNICAL FIELD

This disclosure generally describes minimizing or avoiding data forwarding loops in spanning-tree protocol of a data network.

BACKGROUND

Ethernet switches are used to provide end users of network connectivity to the data network. Switches have a number of network ports which may be categorized as uplinks and downlinks of data connection. An uplink port is one used to connect a switch to an upstream distribution switch, and a downlink port is a port on the switch used to connect to an end user terminal such as a PC.

Network administrators build a larger network by connecting edge switches to core distribution switches through high bandwidth uplinks. Often two or more uplinks are connected to the same or different distribution switches to achieve the uplink data backup. In this manner, if one of the uplink fails, the edge switch still remains connected to the core data network through one of the other uplinks. In such uplink configuration, only one of the uplinks may be configured to be forwarding data at a given time to avoid data forwarding loops.

Topology changes within the network can result in flushing of MAC address tables by spanning-tree. In turn, flushing of MAC addresses result in flooding of frames by the networking devices until the MAC addresses are learned. In general, network administrators strive to reduce the flooding caused due to topology changes.

SUMMARY

Overview

A method in particular embodiments may include providing a common configuration of spanning-tree protocol (STP) on the edge switch to minimize flooding and spanning-tree processing in the network due to topology changes.

A method in particular embodiments may include configuring one or more ports of an access layer entity connected to a distribution layer entity to suppress one or more network topology change information from transmitting to the distribution layer entity of a data network, detecting a state change to a forwarding state on the one or more ports of the access layer entity, and configuring the one or more ports of the access layer entity in the data network connected to the distribution layer entity to transmit a predetermined data packet on the one or more ports of the access layer entity whose state has changed to the forwarding state.

A method in further embodiments may include configuring one or more ports of an access layer entity connected to a distribution layer entity to suppress one or more network topology change information from transmitting to the distribution layer entity of a data network, detecting a spanning-tree state change to a forwarding state on the one or more ports of the access layer entity, and configuring the one or more ports of the access layer entity in the data network connected to the distribution layer entity to transmit one or more of a MAC address table move update (MMU) packet or a dummy multicast packet, or combinations thereof, on the one or more ports of the access layer entity whose state has changed to the forwarding state.

An apparatus in particular embodiments may include a network interface, one or more processors coupled to the network interface, and a memory for storing instructions which, when executed by the one or more processors, causes the one or more processors to configure one or more ports of an access layer entity connected to a distribution layer entity to suppress one or more network topology change information from transmitting to the distribution layer entity of a data network, detect a state change to a forwarding state on the one or more ports of the access layer entity, and configure the one or more ports of the access layer entity in the data network connected to the distribution layer entity to transmit a predetermined data packet on the one or more ports of the access layer entity whose state has changed to the forwarding state.

These and other features and advantages of the present disclosure will be understood upon consideration of the following description of the particular embodiments and the accompanying drawings.

DESCRIPTION OF EXAMPLE EMBODIMENTS

Figure 1A:
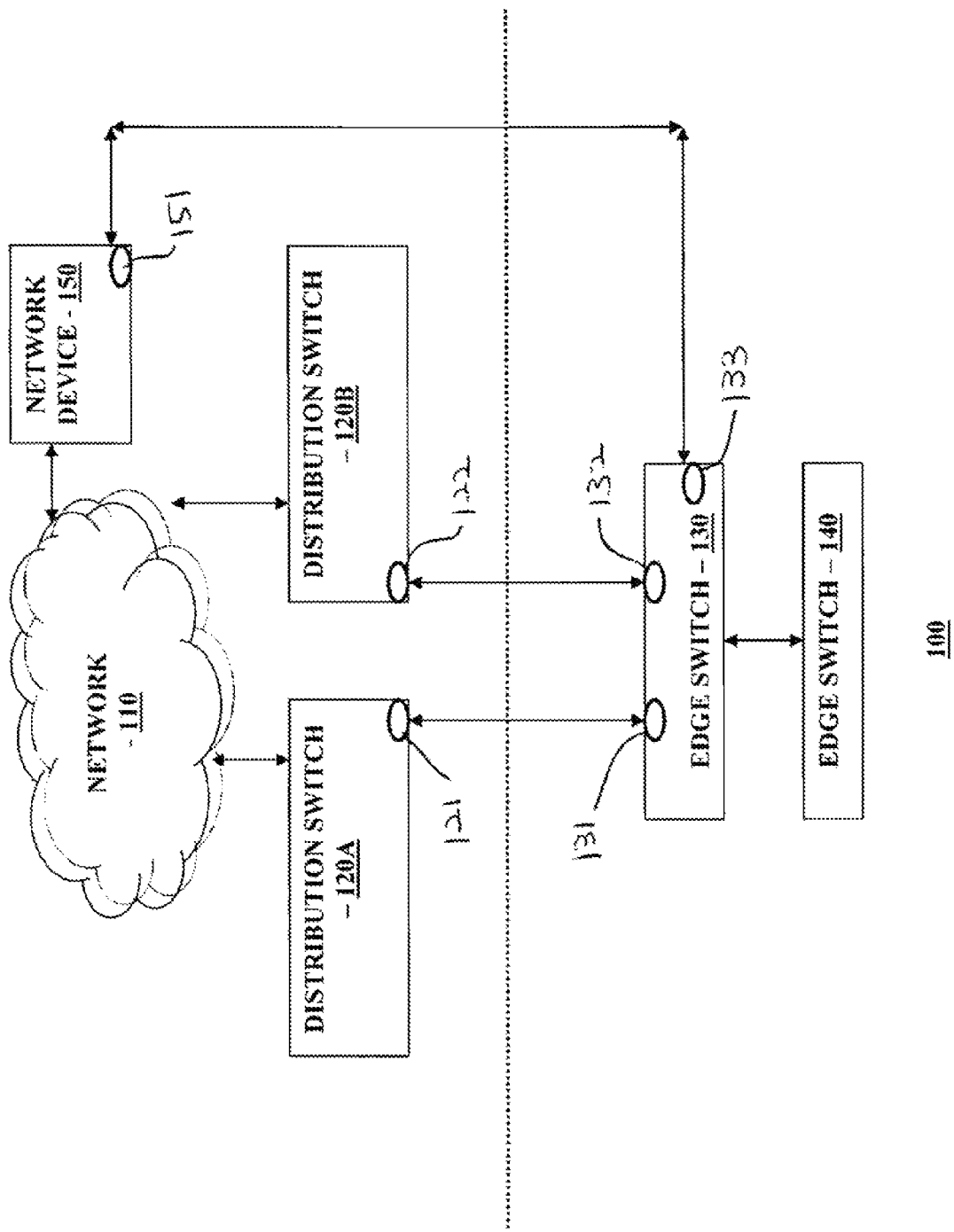
FIG. 1A illustrates an example system for minimizing flooding and/or spanning tree processing.

FIG. 1A illustrates an example system for minimizing flooding and/or spanning-tree processing. Referring to FIG. 1A, data network 100 in particular embodiments includes an access layer and a distribution layer, where the two layers illustrated as divided in FIG. 1A by the dotted line, the area above the dotted line comprising the distribution layer that includes for example, LAN routers, firewalls, layer 3 switches, bridges, VPN access routers, and the like, and which may be configured to handle data routing and also, may be configured to provide policy-based data network connectivity. On the other hand, the access layer shown as below the dotted line may include, for example, layer-2 switches, repeaters, hubs or the like, which are configured to allow users to access the services provided by the distribution layer.

Referring back to FIG. 1A, the access layer of the data network in one embodiment may include edge switch 130 including a plurality of edge switch ports 131, 132, 133. The edge switch 130 is also operatively coupled to edge switch 140 which may be configured to connect to client terminals such as PC terminals. Referring again to FIG. 1A, edge switch 130 in one embodiment is further configured to connect to distribution switches 120A, 120B. More specifically, the edge switch port 131 of edge switch 130 is connected to the distribution switch port 121 of the distribution switch 120A, while the edge switch port 132 of the edge switch 130 is connected to the distribution switch port 122 of the distribution switch 122.

Referring again to FIG. 1A, the distribution switches 120A, 120B are further configured to operatively couple to network 110 which, for example is part of the overall data network 100. Also shown in FIG. 1A is the network device 150 in the distribution layer of the data network 100, and which is also configured to operatively couple to the network 110. Moreover, it can be seen from FIG. 1A that the edge switch port 133 of the edge switch 130 is connected in one embodiment to the network device port 151 of the network device 150 in the distribution layer.

While only two edge switches 130, 140, and two distribution switches 120A, 120B each coupled to the data network 110, and one network device 150 are shown in FIG. 1A, within the scope of the present disclosure, any other suitable number of distribution switches, edge switches and network devices may be provided in the data network 100 as may be desirable for the appropriate network configuration by the administrator.

Accordingly, in particular embodiments, in the data network 100 as shown in FIG. 1A, various approaches to minimize spanning-tree protocol event processing and flooding in distribution layer is provided, based on network topology change in the access layer of the data network 100.

Figure 1B:
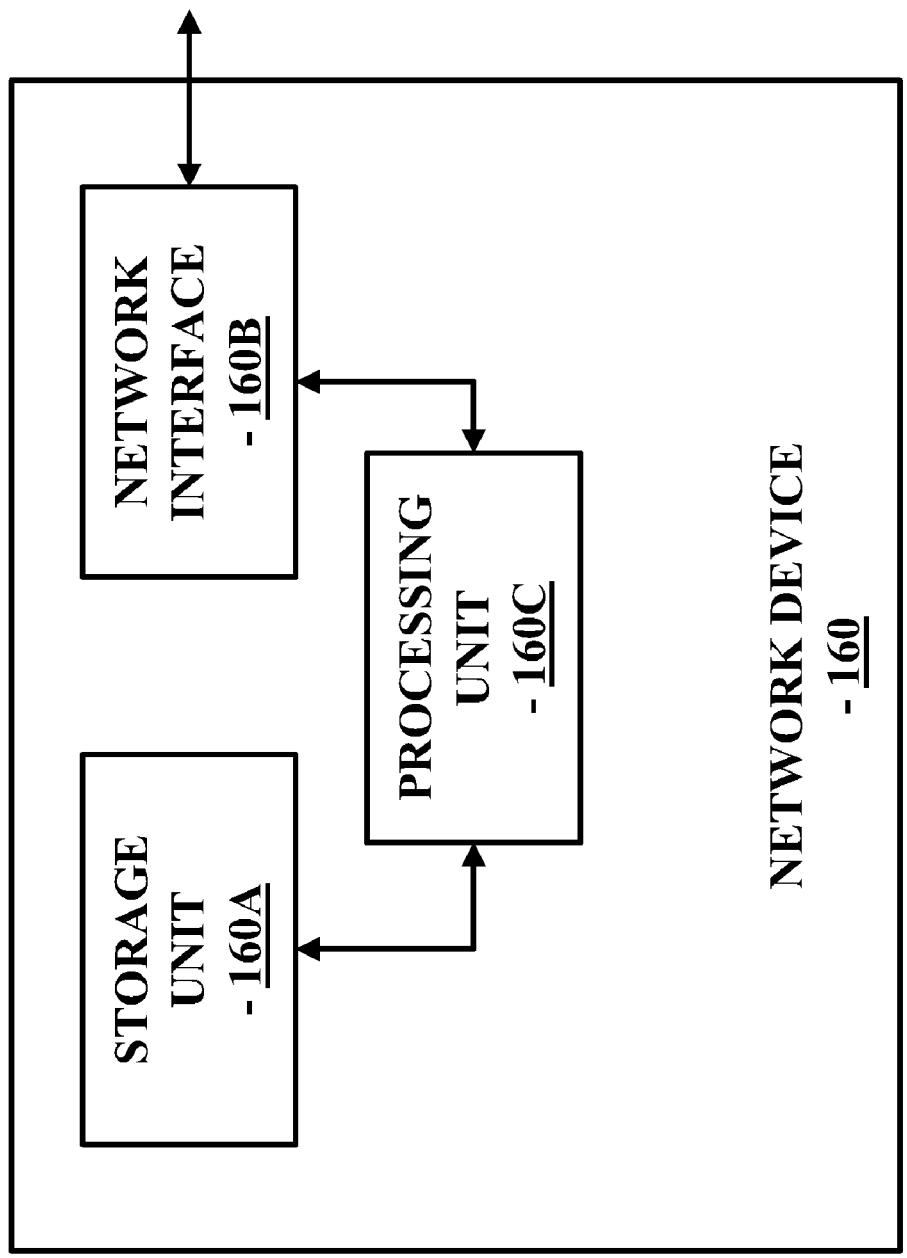
FIG. 1B illustrates an example network device in the system illustrated in FIG. 1A.

FIG. 1B is a block diagram of a network device in the data network of FIG. 1A for practicing one or more embodiments of the present disclosure. Referring to FIG. 1B, the network device 160 in particular embodiments includes a storage unit 160A operatively coupled to a processing unit 160C. In one aspect, the processing unit 160C may include one or more microprocessors for retrieving and/or storing data from the storage unit 160A, and further, for executing instructions stored in, for example, the storage unit 160A, for implementing one or more associated functions. Referring again to FIG. 1B, in one aspect, the network device 160 may be also provided with a network interface 160B which may be configured to interface with the data network 100 (FIG. 1A).

In particular embodiments, as discussed in further detail below, the memory or storage unit 160A of the network device 160 may be configured to store instructions which may be executed by the processing unit 160C to provide a common configuration of spanning-tree protocol (STP) on the distribution network switches and the edge switch to minimize flooding and spanning-tree processing in the network due to topology changes.

Figure 2:
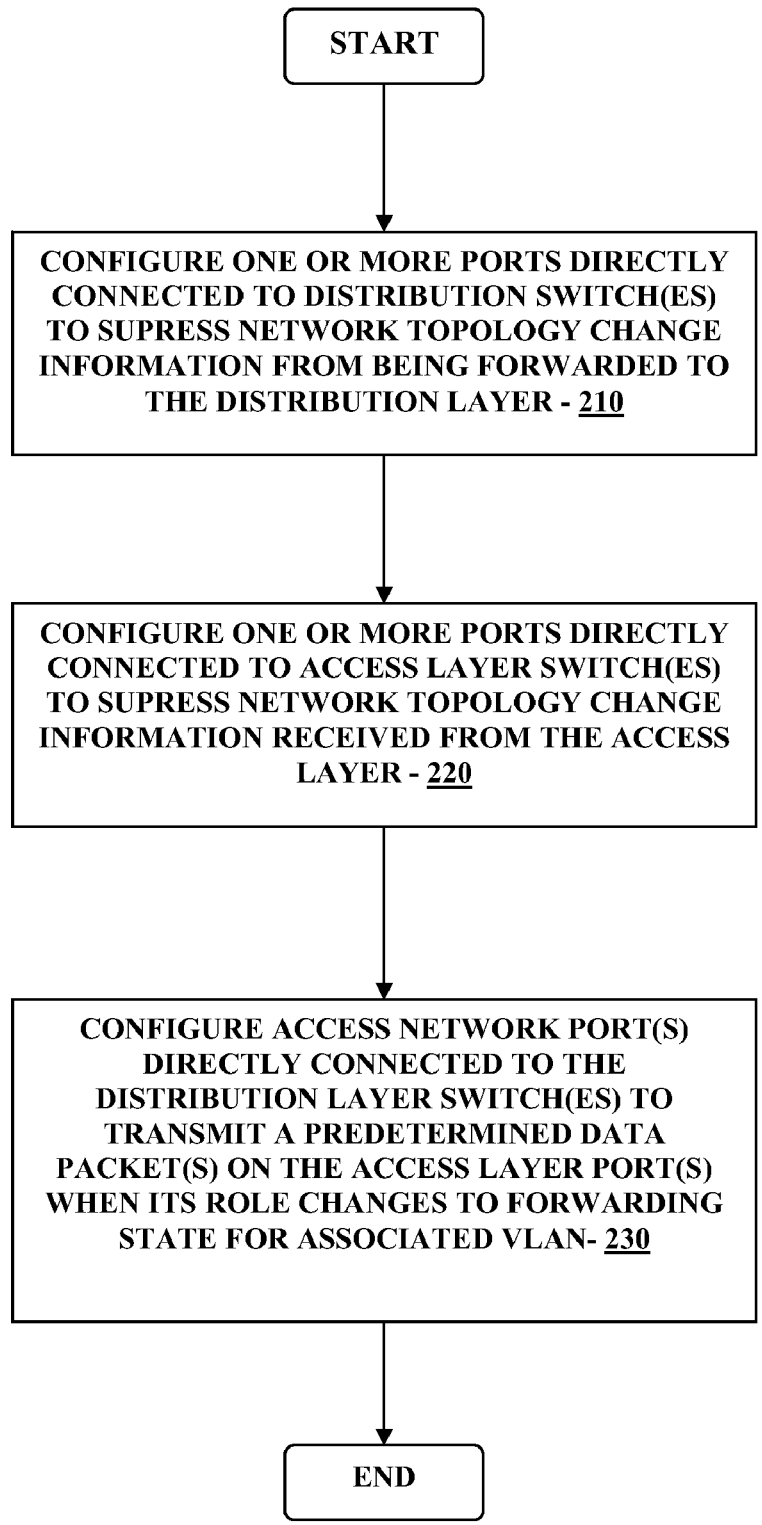
FIG. 2 illustrates an example method for configuring spanning-tree protocol in data network.

FIG. 2 illustrates an example method for configuring spanning-tree protocol in the data network. Referring to FIG. 2, at step 210, when a network topology change occurs, the one or more access layer ports directly connected to the one or more distribution switches in the distribution layer are configured to suppress the network topology change information from passing to the distribution layer in the data network 100. For example, if the one or more access layer ports are configured for TCN suppression, just prior to the data packet being sent, the one or more access layer ports may be configured to suppress forwarding the network topology change information out of the one or more access layer ports to the corresponding ports in the distribution layer of the data network 100.

For example, referring back to FIG. 1A, the access layer ports 131, 132, 133 of the edge switch 130 may be configured to suppress the network topology change information from passing to the corresponding connected distribution layer ports 121, 122, 151, respectively, of the corresponding distribution switch 120A, distribution switch 120B and the network device 150. In this manner, information associated with the network topology change is not provided to the distribution layer ports 121, 122, 151 in one embodiment.

Referring back to FIG. 2, after configuring the one or more access layer ports to suppress any network topology change information from passing to the distribution network, at step 220, the distribution layer ports directly connected to the access layer switches in one embodiment may be optionally configured to suppress any topology change information that may be received from the respective ports in the access layers to which they are connected. For example, at step 220, in particular embodiments, the distribution layer ports 121, 122, 151 of the corresponding distribution switch, distribution switch 120B, and the network device 150 that are directly connected to the access layer ports 131, 132, 133 respectively, of the edge switch 130 (FIG. 1A) may be configured to suppress any network topology change information.

Referring yet again to FIG. 2, at step 230, the one or more ports 131, 132, 133 of the access layer (for example, of the edge switch 130), which are directly connected to the one or more respective ports 121, 122, 151 in the distribution layer of, for example, the respective distribution switches 120A, 120B and the network device 150, are configured to send out a predetermined data packet on the access layer port which has, based on the change in the network topology, changed to a forwarding state for a corresponding VLAN.

In this manner, in particular embodiments, without modifying the spanning tree protocol processing related to the network port roles, the spanning-tree protocol event processing and flooding in the distribution layer is minimized when there is a network topology change in the access layer of the data network 100.

Figure 3A:
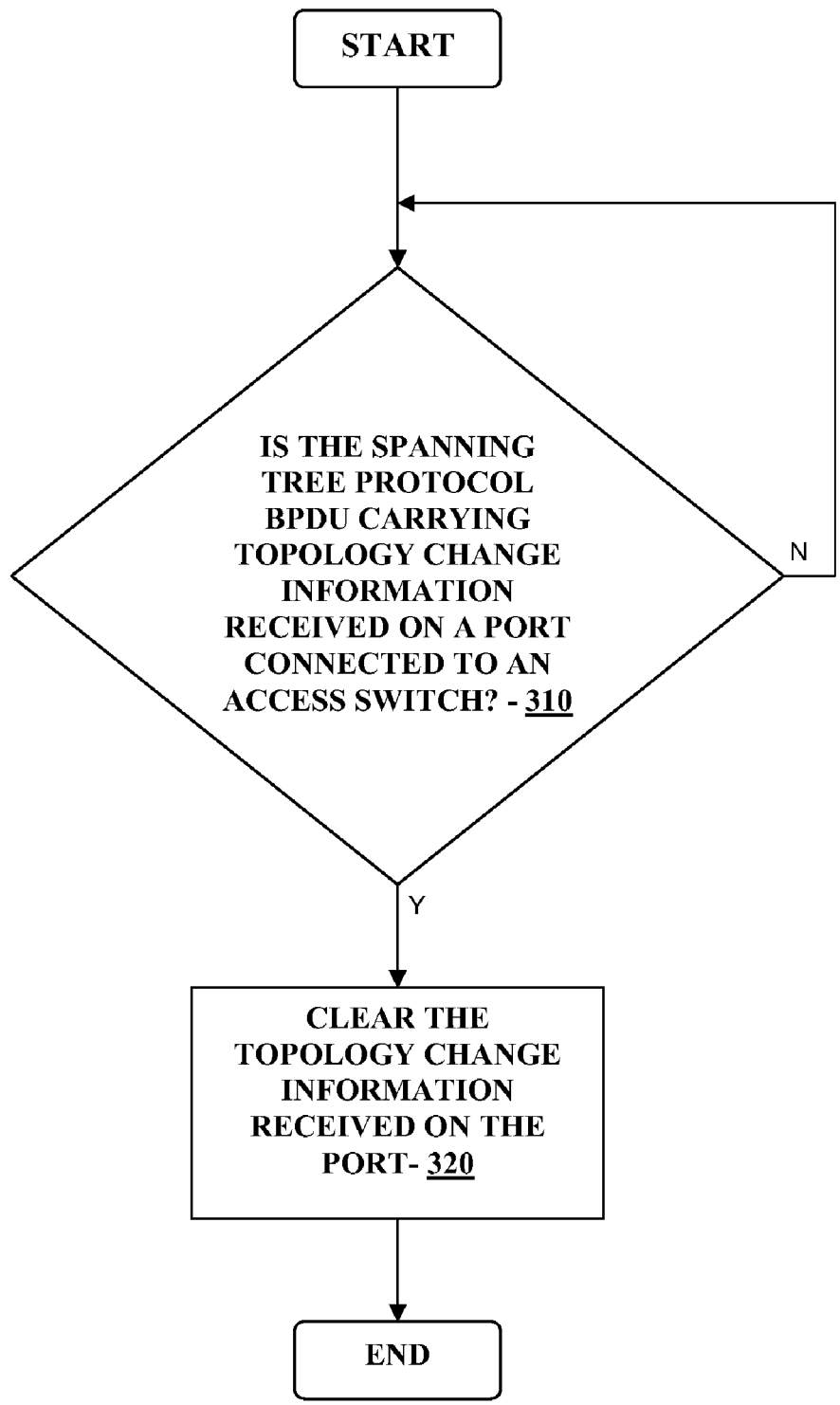
FIGS. 3A-3B illustrates example methods for operation of the ports connected to the access layer switches in the example system of FIG. 1A.
Figure 3B:
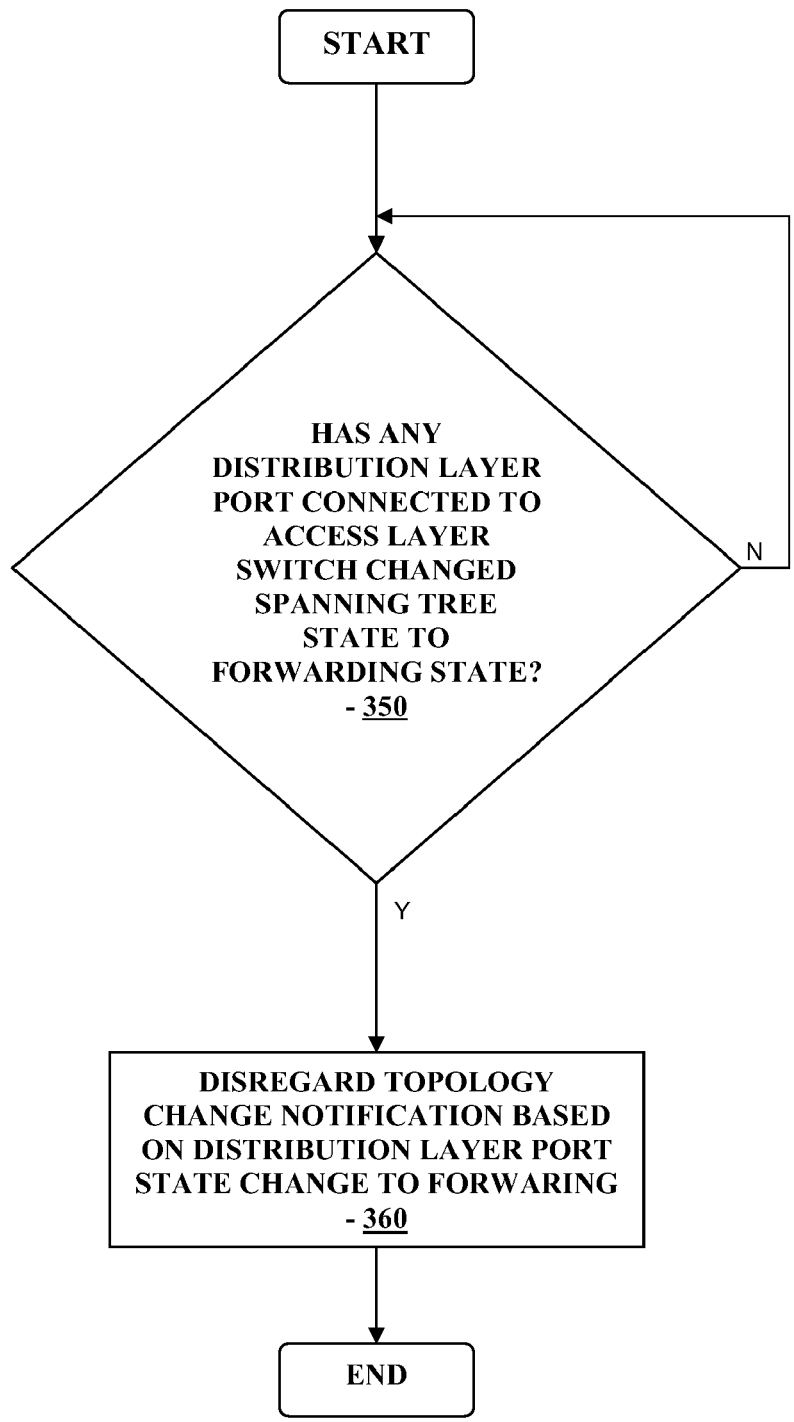

FIGS. 3A-3B illustrates example methods for operation of the ports connected to the access layer switches in the example system of FIG. 1A. Referring to FIG. 3A, at step 310, it is determined whether a spanning-tree protocol Bridge Protocol Data Unit (BPDU) carrying network topology change information is received on a port connected to an access switch. That is, in one embodiment, it is determined whether the spanning-tree protocol topology change information (e.g., in the BPDU) is received on any of the distribution layer ports 121, 122, 151. If it is determined that the spanning-tree protocol BPDU carrying network topology change information is not received on any port connected to an access switch, then the routine returns to the beginning as shown in FIG. 3A.

On the other hand, if it is determined that the spanning-tree protocol BPDU is received on one or more of the distribution layer ports 121, 122, 151 (FIG. 1A) carrying the network topology information, then at step 320 the spanning-tree protocol topology change information in the BPDU may be cleared or the topology change notification (TCN) BPDU may be suppressed by the corresponding one or more distribution layer ports 121, 122, 151.

For example, referring back to FIGS. 1 and 3A, this would be the case when the spanning tree protocol BPDU is sent out on one of the access layer ports 131, 132, 133 by the access switch 130, and is received on one of the distribution layer ports 121, 122, 151. Optionally, in particular embodiments, the distribution switches 120A, 120B may be configured to send out an acknowledgement (ACK) for topology change notification (TCN) to the corresponding edge switch 130 in the access layer upon receiving the spanning-tree protocol BPDU.

Referring now to FIG. 3B, at step 350 it is determined whether any of the ports in the distribution layer in the data network connected to an access layer switch has changed its spanning tree state to forwarding state. That is, in one embodiment, it is determined whether any of the distribution layer ports 121, 122, 151 connected to the access layer switch 130 has changed its spanning-tree state to forwarding state.

If it is determined that the ports in the distribution layer connected to the access layer switch has not changed its spanning-tree state to forwarding state, then the routine returns to the beginning, where it is again determined whether any of the ports in the distribution layer connected to the access layer switch has changed it spanning-tree state to forwarding state. On the other hand, if it is determined that one or more ports in the distribution layer connected to the access layer switch has changed its spanning-tree state to forwarding state, then at step 360, the distribution layer port role change to spanning-tree forwarding state is disregarded for that link of the distribution layer port for the purposes of generating topology change information, and this state change is not indicated in the BPDU which is outgoing from other distribution layer ports.

In this manner, in particular embodiments, the distribution layer ports directly connected to the access layer switches in one embodiment are configured to suppress any topology change information that may be received from the respective ports in the access layers to which they are connected.

Figure 4A:
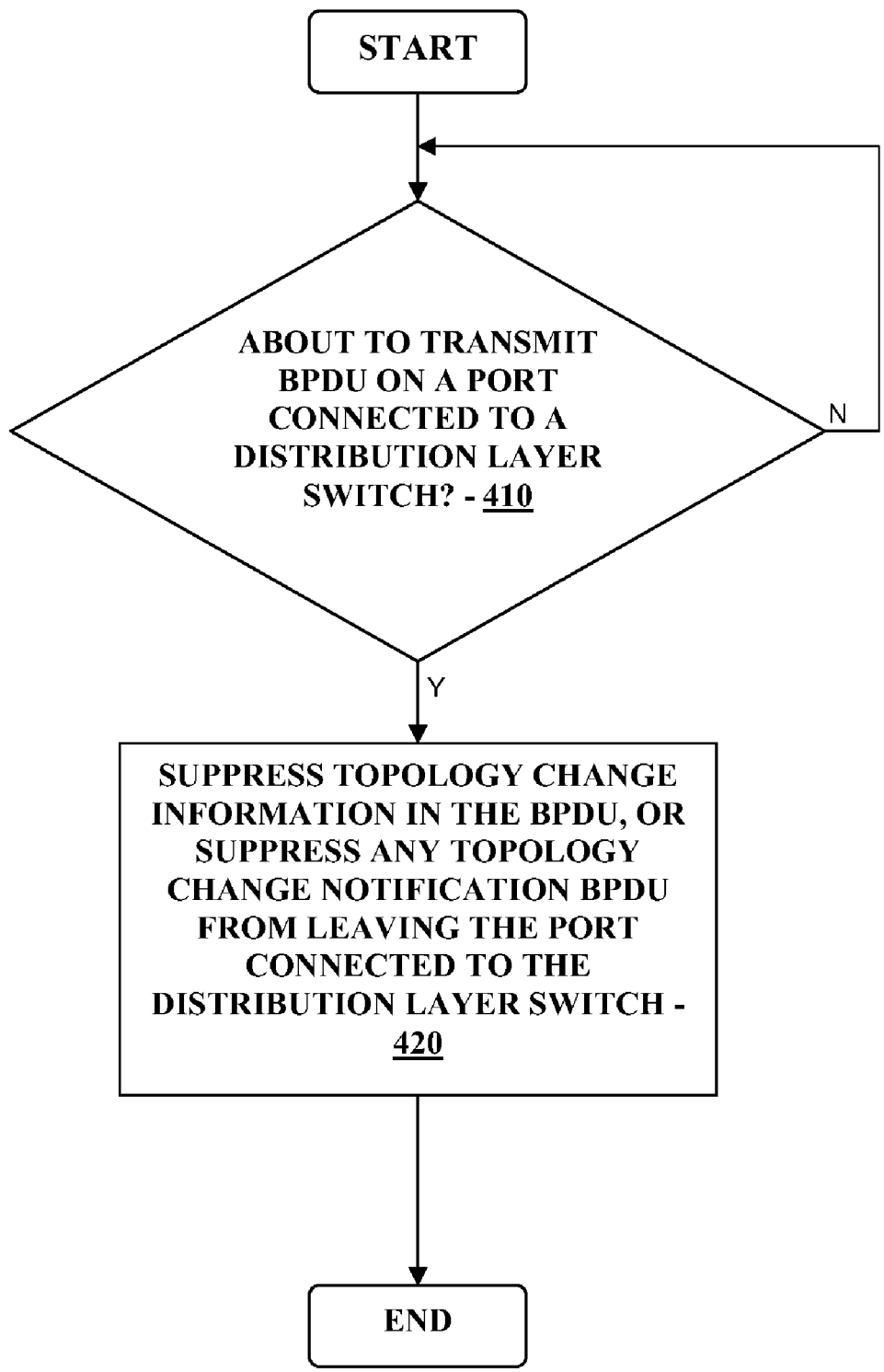
FIGS. 4A-4B illustrates example methods for operation of the access layer ports connected to the distribution network switches.
Figure 4B:
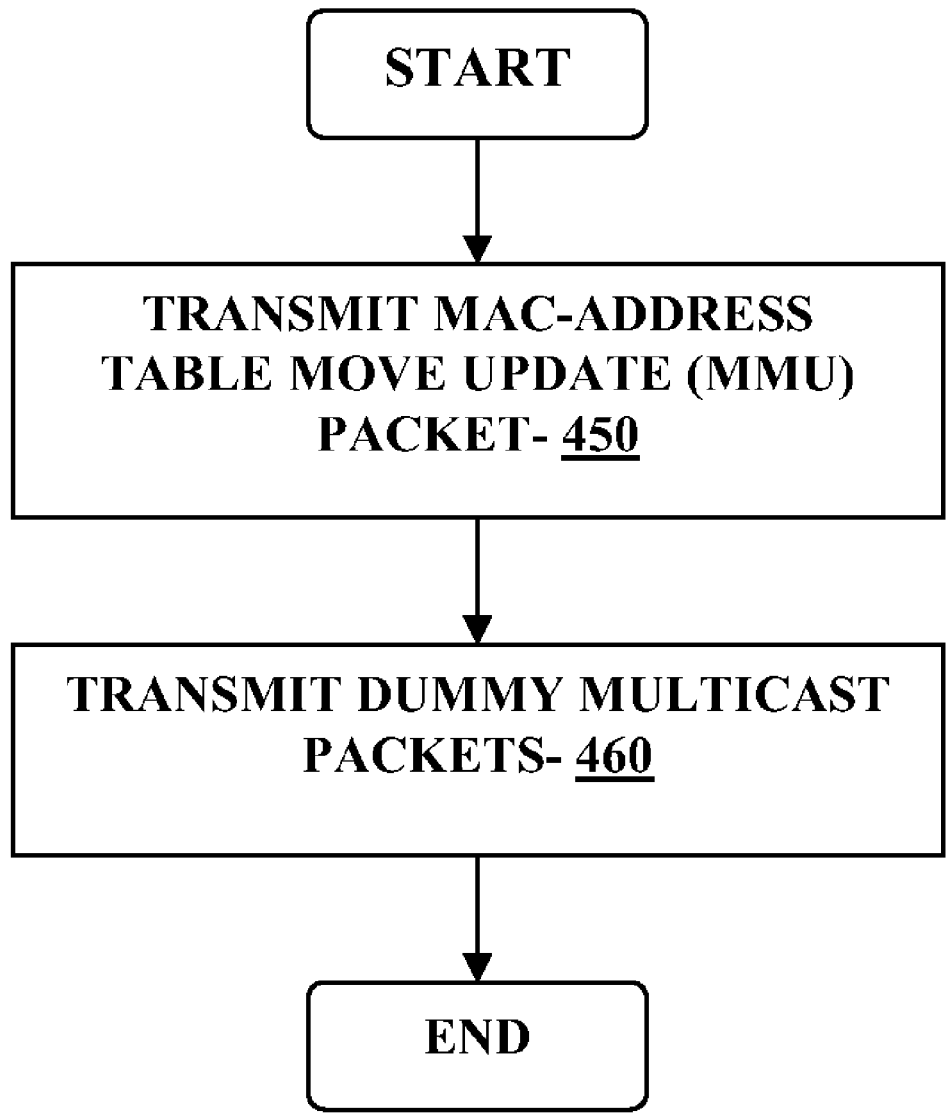

FIGS. 4A-4B illustrates example methods for operation of the access layer ports connected to the distribution network switches. Referring to FIG. 4A, at step 410 it is determined at the access layer switch in the data network whether BPDU is to be transmitted on a port connected to a distribution layer switch. If it is determined that BPDU is not going to be transmitted on a port connected to the distribution layer switch, then the routine returns to the beginning, where it is again determined whether the BPDU is to be transmitted on a port connected to a distribution layer switch. On the other hand, if it is determined that the BPDU is going to be transmitted on a port connected to a distribution layer switch, then at step 420, the topology change notification BPDU is suppressed, or alternatively, any topology change information in the BPDU is suppressed from going out of or leaving the port connected to the distribution layer switch.

Referring now to FIG. 4B, at step 450, in particular embodiments, the one or more ports 131, 132, 133 of the access layer (for example, of the edge switch 130), which are directly connected to the one or more respective ports 121, 122, 151 in the distribution layer of, for example, the respective distribution switches 120A, 120B and the network device 150, is configured to send out a MAC address table move update (MMU) packet on the access layer port which has, based on the change in the network topology, changed to a forwarding state for a corresponding VLAN.

That is, in one embodiment, the MAC address table move update (MMU) packet is configured to carry a set of MAC addresses and VLAN that were learnt on the access layer devices, such as, for example, the edge switch 130 (FIG. 1A). Accordingly, in one embodiment, the edge switch 130 in the access layer of the data network 100 may be configured to simply enable the transmit capability, and the distribution layer devices such as the distribution switches 120A, 120B, are enabled to receive the MAC address table move update (MMU) packet.

Referring back to FIG. 4B, at step 460, in particular embodiments, the one or more ports 131, 132, 133 of the access layer which are directly connected to the one or more respective ports 121, 122, 151 in the distribution layer is configured to send out one or more dummy multicast packet on the access layer port which has, based on the change in the network topology, changed to a forwarding state for a corresponding VLAN. More particularly, in one embodiment, the dummy multicast packets may be sent out with source MAC-addresses set to MAC addresses that have been learnt on the access layer switches. For instance, the hosts that are connected in the access layer of the data network 100.

Referring again to FIGS. 2 and 4A-4B, the predetermined data packets transmitted on the access layer ports whose role has changed to the forwarding state at step 230 may include either the MAC address table move update (MMU) packet, or the one or more dummy multicast packets. In addition, as discussed, the transmitted predetermined data packets may also include both the MAC address table move update (MMU) packet, and the dummy multicast packet. This approach, in one embodiment, may be configured to help the network switches in the distribution layer to quickly re-learn the MAC address of the hosts to the access switches on the correct port. Also, in one aspect, when there are multiple switches in the access layer of the data network 100, each of the switches may be configured to send out the MAC address table move update (MMU) packet and the one or more dummy multicast packets when a port changes its role to the forwarding state.

Accordingly, in particular embodiments, flooding layer-two traffic may be avoided by not flushing MAC address table entries on any of the distribution switches 120A, 120B in the distribution layer of the data network 100.

In this manner, in accordance with one embodiment of the present invention, without modifying the spanning-tree protocol (STP) processing related to network switch port roles, the network administrator may modify the STP topology change information processing on the ports connecting the access network switch to the distribution network switch, or vice versa in the data network 100. In this manner, the access network in one embodiment may be considered as connected to the distribution network from a single logical link, as there is only one forwarding path between the access network and the distribution network of the data network 100 at any given time.

Indeed, in accordance with the various embodiments of the present invention, methods and system for minimizing spanning-tree protocol (STP) event processing and flooding in distribution networks when network topology changes occur in the access network. Accordingly, no change is required for the STP processing related to the access network switch and distribution network switch port roles.

In addition, in accordance with the various embodiments of the present invention, a minor modification is required to the STP topology change information handling limited to the distribution switch ports connected to the access network switches, or to the ports of the access network switch connected to the distribution switches. Moreover, flushing of MAC-address tables in the distribution switches may be eliminated due to changes in the topology in the access network switches. That is, in accordance with one embodiment of the present invention, flooding of layer 2 data traffic in the distribution network switches due to changes in the network topology in the access network switches may be eliminated.

Furthermore, in accordance with one embodiment of the present invention, faster data traffic convergence for STP may be achieved by enabling the MAC address table move update feature whenever the network topology change occurs in the access networks.

A method in particular embodiments includes configuring one or more ports of an access layer entity connected to a distribution layer entity to suppress one or more network topology change information from transmitting to the distribution layer entity of a data network, detecting a state change to a forwarding state on the one or more ports of the access layer entity, and configuring the one or more ports of the access layer entity in the data network connected to the distribution layer entity to transmit a predetermined data packet on the one or more ports of the access layer entity whose state has changed to the forwarding state.

In one aspect, the predetermined data packet may include one or more of a MAC address table move update (MMU) packet or a dummy multicast packet, or combinations thereof, where the MMU packet may include one or more MAC addresses associated with a respective one or more VLAN.

The distribution layer entity may include a distribution layer switch, while the access layer entity may include an edge switch.

In a further embodiment, the detected state change may include a spanning-tree state change to the forwarding state, and further, where configuring the one or more ports connected to an access layer entity may include transmitting a spanning-tree protocol bridge protocol data unit on a port carrying network topology change information.

A method in a further embodiment may include configuring one or more ports of an access layer entity connected to a distribution layer entity to suppress one or more network topology change information from transmitting to the distribution layer entity of a data network, detecting a spanning-tree state change to a forwarding state on the one or more ports of the access layer entity, and configuring the one or more ports of the access layer entity in the data network connected to the distribution layer entity to transmit one or more of a MAC address table move update (MMU) packet or a dummy multicast packet, or combinations thereof, on the one or more ports of the access layer entity whose state has changed to the forwarding state.

An apparatus in accordance with another embodiment includes a network interface, one or more processors coupled to the network interface, and a memory for storing instructions which, when executed by the one or more processors, causes the one or more processors to configure one or more ports of an access layer entity connected to a distribution layer entity to suppress one or more network topology change information from transmitting to the distribution layer entity of a data network, detect a state change to a forwarding state on the one or more ports of the access layer entity, and configure the one or more ports of the access layer entity in the data network connected to the distribution layer entity to transmit a predetermined data packet on the one or more ports of the access layer entity whose state has changed to the forwarding state.

One or more storage devices having processor readable code embodied thereon, said processor readable code for programming one or more processors to perform a method in particular embodiments may include configuring one or more ports of an access layer entity connected to a distribution layer entity to suppress one or more network topology change information from transmitting to the distribution layer entity of a data network, detecting a state change to a forwarding state on the one or more ports of the access layer entity, and configuring the one or more ports of the access layer entity in the data network connected to the distribution layer entity to transmit a predetermined data packet on the one or more ports of the access layer entity whose state has changed to the forwarding state.

An apparatus in still another embodiment may include means for configuring one or more ports of an access layer entity connected to a distribution layer entity to suppress one or more network topology change information from transmitting to the distribution layer entity of a data network, means for detecting a state change to a forwarding state on the one or more ports of the access layer entity, and means for configuring the one or more ports of the access layer entity in the data network connected to the distribution layer entity to transmit a predetermined data packet on the one or more ports of the access layer entity whose state has changed to the forwarding state.

The various processes described above including the processes performed by one or more of the distribution switch 120A, 120B, edge switches 130, 140 or other network devices in the software application execution environment in the data network 100 including the processes and routines described in conjunction with FIGS. 2-4, may be embodied as computer programs developed using an object oriented language that allows the modeling of complex systems with modular objects to create abstractions that are representative of real world, physical objects and their interrelationships. The software required to carry out the inventive process, which may be stored in the memory such as, for example, the storage unit 160A of the network device 160 (FIG. 1B) or switch may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
configuring one or more ports of an access layer network device connected to a distribution layer network device to suppress transmission of one or more network topology change information messages to the distribution layer network device of a data network;
detecting a state change to a forwarding state on the one or more ports of the access layer network device; and
in response to the detecting of the state change, transmitting a predetermined data packet on the one or more ports of the access layer network device whose state has changed to the forwarding state wherein the predetermined data packet includes one or more of a MAC address table move update (MMU) packet or a dummy multicast packet, or combinations thereof wherein
in response to the configuring, no network topology change information messages are transmitted by the access layer network device from the one or more ports changed to the forwarding state, despite the detected state change of the one or more ports of the access layer network device.

2. The method of claim 1 wherein the MMU packet includes one or more MAC addresses associated with a respective one or more VLANs.

3. The method of claim 1 wherein the distribution layer network device includes a distribution layer switch.

4. The method of claim 1 wherein the access layer network device includes an edge switch.

5. The method of claim 1 wherein the detected state change includes a spanning-tree state change to the forwarding state, and further, wherein the step of configuring the one or more ports connected to an access layer network device includes transmitting a spanning-tree protocol bridge protocol data unit on a port carrying network topology change information.

6. A method, comprising:
    configuring one or more ports of an access layer network device connected to a distribution layer network device to suppress transmission of one or more network topology change information messages to the distribution layer network device of a data network;
    detecting a spanning-tree state change to a forwarding state on the one or more ports of the access layer network device; and
    in response to the detecting of the state change, transmitting one or more of a MAC address table move update (MMU) packet or a dummy multicast packet, or combinations thereof, on the one or more ports of the access layer network device whose state has changed to the forwarding state wherein
        in response to the configuring, no network topology change information messages are transmitted by the access layer network device from the one or more ports changed to the forwarding state, despite the detected state change of the one or more ports of the access layer network device.

7. The method of claim 6 wherein the MMU packet includes one or more MAC addresses associated with a respective one or more VLANs.

8. The method of claim 6 wherein the distribution layer network device includes a distribution layer switch.

9. The method of claim 6 wherein the access layer network device includes an edge switch.

10. An apparatus, comprising: a network interface;
    one or more processors coupled to the network interface; and
    a memory for storing instructions which, when executed by the one or more processors, causes the one or more processors to configure one or more ports of an access layer network device connected to a distribution layer network device to suppress transmission of one or more network topology change information messages to the distribution layer network device of a data network, detect a state change to a forwarding state on the one or more ports of the access layer network device, and transmit a predetermined data packet on the one or more ports of the access layer network device whose state has changed to the forwarding state in response to the detection of the state change, wherein the predetermined data packet includes one or more of a MAC address table move update (MMU) packet or a dummy multicast packet, or combinations thereof wherein
        in response to the configuring, no network topology change information messages are transmitted by the access layer network device from the one or more ports changed to the forwarding state, despite the detected state change of the one or more ports of the access layer network device.

11. The apparatus of claim 10 wherein the predetermined data packet includes one or more of a MAC address table move update (MMU) packet or a dummy multicast packet, or combinations thereof.

12. The apparatus of claim 10 wherein the MMU packet includes one or more MAC addresses associated with a respective one or more VLANs.

13. The apparatus of claim 10 wherein the distribution layer network device includes a distribution layer switch.

14. The apparatus of claim 10 wherein the access layer network device includes an edge switch.

15. One or more storage devices having non-transitory processor readable code embodied thereon, said processor readable code for programming one or more processors to perform a method comprising:
    configuring one or more ports of an access layer network device connected to a distribution layer network device to suppress transmission of one or more network topology change information messages to the distribution layer network device of a data network;
    detecting a state change to a forwarding state on the one or more ports of the access layer network device; and
    in response to the detecting of the state change, transmitting a predetermined data packet on the one or more ports of the access layer network device whose state has changed to the forwarding state wherein the predetermined data packet includes one or more of a MAC address table move update (MMU) packet or a dummy multicast packet, or combinations thereof wherein
        in response to the configuring, no network topology change information messages are transmitted by the access layer network device from the one or more ports changed to the forwarding state, despite the detected state change of the one or more ports of the access layer network device.

16. The one or more storage devices of claim 15 wherein the predetermined data packet includes one or more of a MAC address table move update (MMU) packet or a dummy multicast packet, or combinations thereof.

17. The one or more storage devices of claim 15 wherein the MMU packet includes one or more MAC addresses associated with a respective one or more VLANs.

18. The one or more storage devices of claim 15 wherein the distribution layer network device includes a distribution layer switch.

19. The one or more storage devices of claim 15 wherein the access layer network device includes an edge switch.

20. An apparatus, comprising:
    means for configuring one or more ports of an access layer network device connected to a distribution layer network device to suppress transmission of one or more network topology change information messages to the distribution layer network device of a data network;
    means for detecting a state change to a forwarding state on the one or more ports of the access layer network device; and
    means for transmitting a predetermined data packet on the one or more ports of the access layer network device whose state has changed to the forwarding state in response to the detecting of the state change, wherein the predetermined data packet includes one or more of a MAC address table move update (MMU) packet or a dummy multicast packet, or combinations thereof wherein
        in response to the configuring, no network topology change information messages are transmitted by the access layer network device from the one or more ports changed to the forwarding state, despite the detected state change of the one or more ports of the access layer network device.

* * * * *